US012664192B1

(12) United States Patent
Nicks, III

(10) Patent No.: US 12,664,192 B1
(45) Date of Patent: Jun. 23, 2026

(54) ANALYTICAL SEARCH RESULTS FOR A COMPLEX QUERY

(71) Applicant: Danti AI, Inc., Atlanta, GA (US)

(72) Inventor: Martice Eldridge Nicks, III, Sarasota, FL (US)

(73) Assignee: Danti AI, Inc., Atlanta, GA (US)

( * ) Notice: Subject to any disclaimer, the term of this patent is extended or adjusted under 35 U.S.C. 154(b) by 0 days.

(21) Appl. No.: 19/195,197

(22) Filed: Apr. 30, 2025

(51) Int. Cl.
*G06F 16/00* (2019.01)
*G06F 16/3332* (2025.01)
*G06F 16/334* (2025.01)

(52) U.S. Cl.
CPC ...... *G06F 16/3344* (2019.01); *G06F 16/3334* (2019.01)

(58) Field of Classification Search
CPC .......................... G06F 16/3344; G06F 16/3334
USPC ......................................... 707/771
See application file for complete search history.

(56) References Cited

U.S. PATENT DOCUMENTS 11,809,508 B1 * 11/2023 Kallman ............. G06F 16/9537
12,135,949 B1 * 11/2024 Cameron ............... G06F 40/40

2014/0114952 A1 * 4/2014 Robinson .......... G06F 16/24532
707/718
2016/0092584 A1 * 3/2016 Nigam ................ G06F 16/9024
707/798
2021/0182659 A1 * 6/2021 Makhija ............... G06V 30/147
2021/0216601 A1 * 7/2021 Galitsky .......... G06F 16/24564
2023/0352169 A1 * 11/2023 Whitmire ............... G16H 10/60
2024/0232199 A1 * 7/2024 Hambardzumyan ........................
G06F 16/2455
2024/0386015 A1 * 11/2024 Crabtree ............. G06F 16/9024
2025/0259044 A1 * 8/2025 Crabtree ................ G06N 3/042

* cited by examiner

*Primary Examiner* — Monica M Pyo

(74) *Attorney, Agent, or Firm* — Cognition IP, P.C.; Edward Steakley; Saleh Kaihani

(57) ABSTRACT

A search platform can receive a complex query, and generate raw data in response to the complex query, based on artificial intelligence searching of a semantic search space, relevant to the context of the complex query. The platform can obtain, generate and/or recommend analytical models capable of providing robust answers to the complex query. The platform can augment the semantic search space with analytical models and search the augmented search space for analytical models relevant to the complex query. The answers, provided by the platform to the complex query, can be the result of performing complex analytical workflows.

14 Claims, 7 Drawing Sheets

- Performance Spec

- Hyper Parameters of Models

- Data Constraints

- Workflow Definitions of
Kernel Meshes

700

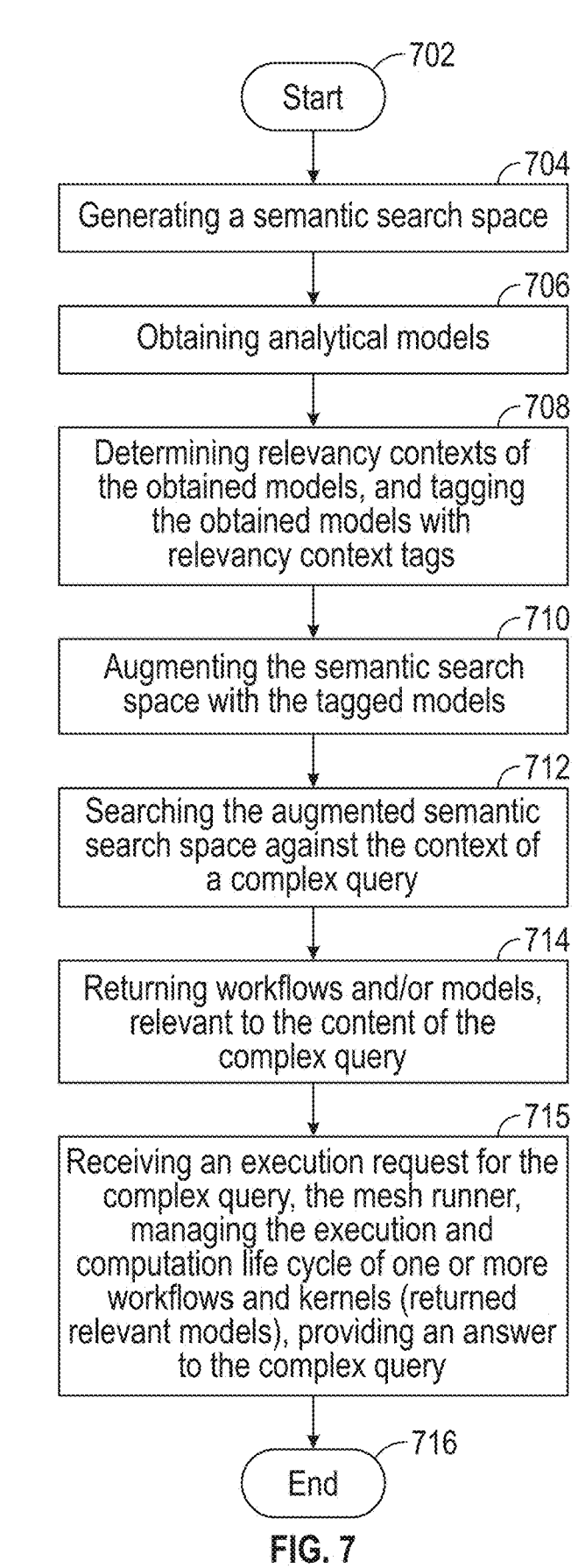

702

Start

704

Generating a semantic search space

706

Obtaining analytical models

708

Determining relevancy contexts of the obtained models, and tagging the obtained models with relevancy context tags

710

Augmenting the semantic search space with the tagged models

712

Searching the augmented semantic search space against the context of a complex query

714

Returning workflows and/or models, relevant to the content of the complex query

715

Receiving an execution request for the complex query, the mesh runner, managing the execution and computation life cycle of one or more workflows and kernels (returned relevant models), providing an answer to the complex query

716

End

FIG. 7

ANALYTICAL SEARCH RESULTS FOR A COMPLEX QUERY

BACKGROUND

Field

This invention relates generally to the field of artificial intelligence, and more particularly to using artificial intelligence in search technology.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While artificial intelligence (AI) has revolutionized many technological fields, the advances in the field of search technology have been focused on retrieving existing data, or perhaps summarizing existing data with a large language model (LLM), as opposed to generating new data, in response to a user complex query. The type of new data, that a user may be interested in, can be obtained by applying analytical skills, or models, similar to those employed by human subject matter experts. A user can ask the existing search engines "what is the economic impact of the recent Southern California fires," and the existing search engines search the Internet for preexisting material (e.g., articles) that have answered that question. Existing search engines might also not return meaningful results for questions, requiring analysis, that do not have related preexisting material on the Internet. In other words, existing search engines, in many cases, can only answer search queries that have already been answered by a human subject matter expert on the Internet. As a result, the current search engine technology is focused on retrieval or summarization of existing data, as opposed to finding robust answers by applying analytical skills. Another area current search engines can improve is to be able to not only retrieve raw data, but apply a multi-modal approach, correlating various analytical models that might be needed for answering a complex question, integrating and summarizing the result to generate answers that a team of human subject matter experts may produce if they analyzed the same raw data.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIG. 7 illustrates an example flowchart of a method of preparing a robust search space for a complex query.

DETAILED DESCRIPTION

Figure 1:
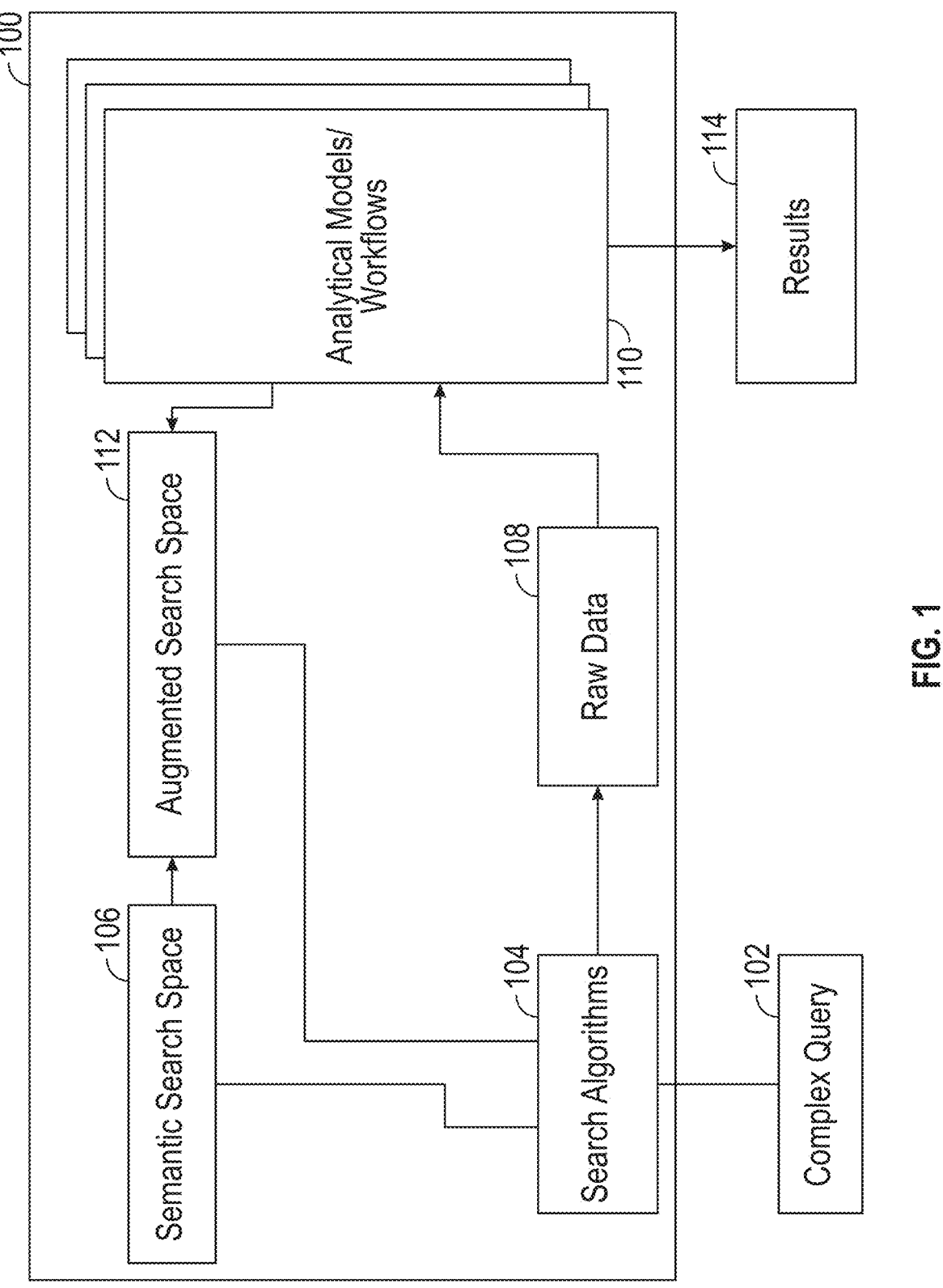
FIG. 1 illustrates a block diagram of an example search platform providing answers to a complex query, according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Large language models and artificial intelligence (AI) have revolutionized many technology fields, including search engine technology. Users can enter a search term and receive an AI-generated summary of a response to the search term. However present search technology, even AI-based technology, seems to extend only to generating a summary of the most applicable results that are already present in the Internet, without processing the available information, much further than their existing form. In other words, while users can retrieve concrete, or discrete information, when it comes to search queries that might require analytical processing of the information, the existing search technology may not offer a solution. For example, while a consumer can search the internet for concrete and discrete existing information, such as "what are some recent fires in Southern California," the consumer, using existing technology, may not be able to ask a question that would require an analytical approach and processing of the present information, as well as information that are not explicitly present in the search term. For example, if the user were to ask, "what is the economic impact of the recent Southern California fires on my property located at 123 Main Street," the existing search technology may not be able to perform the analytical processing necessary to generate a response to such a query. Similar complex queries, requiring application of analytical skills can arise in various industries Furthermore, many users of search technology may not be savvy in various analytical processing that may be needed to answer questions that require analytical processing. Consequently, there is a need for more robust search technology that not only retrieves relevant information, but also generates and/or retrieves relevant analytical models, utilizes multi-modal approaches, correlates and/or otherwise integrates those models, and their outputs, to perform analytical processing and can provide answers to complex queries.

FIG. 1 illustrates a block diagram of an example search platform 100 providing answers to a complex query 102, according to an embodiment. A user can enter a complex query 102 into the search platform 100. The complex query 102 can be an analytical question. The answer to the complex query 102 can be obtained by applying one or more analytical models. In other words, the answer to the complex query 102 is more intricate than just retrieving Internet information and summarizing the information by artificial intelligence or large language models (LLMs).

Search algorithms 104 can include algorithms, which can build data objects, based on the semantic and context of the terms in the complex query 102. Search algorithms 104 can build a semantic search space 106 and generate raw data 108. Raw data 108 can also be obtained from other sources, and not necessarily from the search algorithms 104. In other words, the described embodiments can be deployed, regardless of the source of the raw data 108. Various examples of the search algorithms 104, the semantic search space 106 and the generation of raw search data can be found in U.S. patent application Ser. No. 18/210,544, filed on Jun. 15, 2023, entitled "Artificial Intelligence Geospatial Search," the content of which is incorporated herein by reference in its entirety and should be considered a part of this specification. Examples of raw data 108 can depend on the field, context and characteristics of the query. For example, for complex queries, having some contextual relation to coordinates or locations on planet Earth, the raw data 108 can include earth observation (EO) data, synthetic aperture radar (SAR) data, automatic identification system (AIS) data, and others. Other fields, contexts and characteristics of query can be relevant and include other sources of raw data.

The search platform 100 can include systems and methods directed to finding, retrieving, generating, and/or recommending analytical models/workflows 110, relevant to responding to the complex query 102. The search platform 100 can use the analytical models/workflows 110 to generate an augmented search space 112. The augmented search space 112 can include the semantic search space 106 data objects, as well as the analytical models/workflows 110, as additional data objects. The search algorithms 104 can perform searching, and/or AI-based matching between the semantic and contexts of the complex query 102, against the augmented search space 112, returning results 114.

In some embodiments, a user can define one or more analytical models and/or workflows to be searched by the search algorithms 104 against a complex query 102. For example, an insurance company user can register analytical models and/or workflows 110 that are applicable to the kinds of complex queries 102 the insurance company user is interested in answering.

An analytical model can alternatively be referred to as a kernel, a model, a computational unit, an analytical processing module or similar terminology. The specifics of a kernel can vary from industry to industry and be dependent on the purpose of an analytical model in a given industry. The model or kernel can be code or a collection of codes that perform a discrete or selected analytical task, as defined by the functionality encoded in the kernel or by the kernel. For example, a kernel can receive an input image and identify areas of the image that are likely to correspond to fire damage. Another kernel can be a model that can detect ships, given satellite imagery as input. Kernels can be implemented using artificial intelligence techniques and/or other methods applicable to the selected purpose of the kernel. A kernel can have input data constraints, which outline the type of data and the characteristics of the data, which the kernel can handle. For example, some image processing models require a specific angle of observation in the input data, others can only process a range of resolutions, and so forth.

Kernels can be arranged in a directed graph architecture defining a mesh or workflow. The search platform 100, according to the described embodiments, can utilize a kernel mesh platform, which can be a distributed computational orchestration system, designed to manage complex workflows through a hierarchical state machine architecture. The platform can enable the definition, storage, validation, execution and monitoring of computational graphs composed of specialized processing units (kernels) arranged in interconnected meshes. Some kernels can be or can include computational units, and in some cases can be or can include AI- or ML-based models with subroutines for performing calculations, related to an analytical task. Although, kernels with AI- or ML-based technology are not required in every scenario. Some kernels may be rule-based, or driven by statistical analysis, or other technology. The specifics of the implementation of a kernel is industry or usage specific and can change for different users of the search platform 100. Kernels can be containerized models, provided to and run within the search platform 100. Kernels can also be third-party server-hosted, and accessed by the described search platform, via one or more application programming interfaces (APIs). Kernels and/or meshes (workflows) can also be defined and provided, internally, by the search platform 100.

Figure 2:
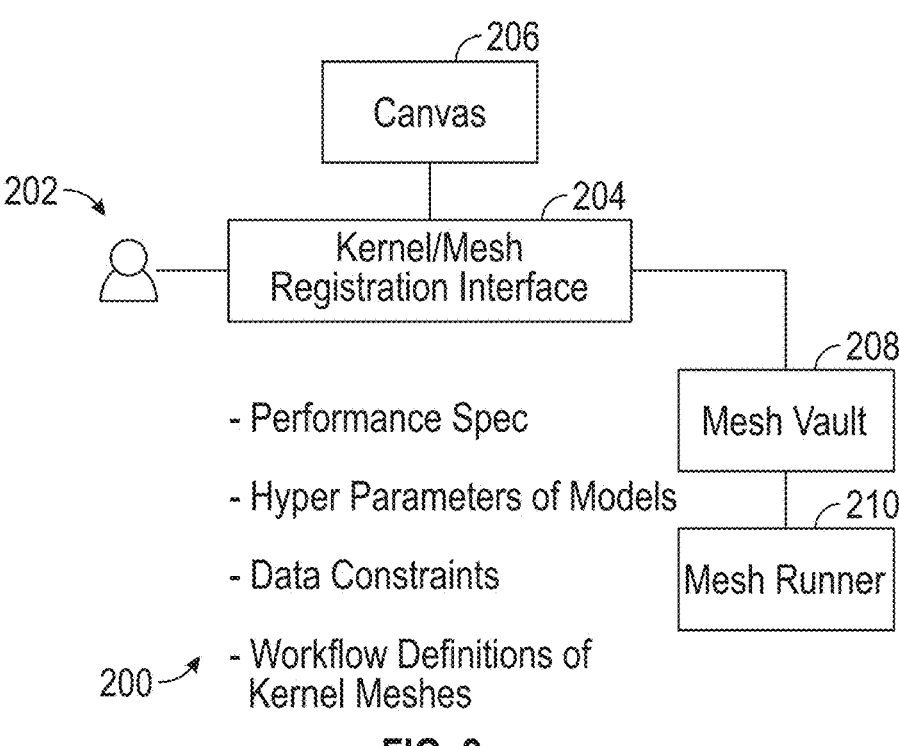
FIG. 2 illustrates a block diagram of components a user can, optionally, employ to register one or more models and/or workflows within the search platform.

In some embodiments, a user can introduce their preferred models to the search platform 100. In this scenario, the user can register a model and/or a workflow, using a model/workflow registration interface. FIG. 2 illustrates a block diagram 200 of the components, a user 202 can, optionally, employ to register one or more models and/or workflows within the search platform 100. The user 202 can register a bank of kernels with the search platform 100 and one or more workflows that outline a processing pipeline of input data using the registered kernels or a selection of them. The search platform can provide a kernel/mesh registration interface 204, having a canvas 206. The user 202 can drag and drop their registered kernels to compose a workflow. The canvas 206 is a user interface element that can provide drag and drop functionality and allow the user to connect the kernels to generate a visual representation of a directed computational graph.

The user 202 and/or the search platform 100 can define various parameters for each kernel. For example, a kernel might have performance specifications, one or more hyper parameters of the models of the kernel and a set of data constraints. The data constraints of a kernel, also referred to as data constraint schema, can be the set of input data constraints, which the model requires to function. For example, some models that accept image input data only work on images of particular terrains, such as snow (and not water). Other models that require ground sample distances input data require a range of resolutions to function properly. Some models require the input data to have been obtained from a range of acceptable (to the model) incident angles (e.g., look angle). These examples are only provided as an illustration in an industry whose raw data includes the data outlined in the examples. Other industries can have different raw data and different analytical models of interest to them. The search platform 100 can accommodate an unlimited number of data constraints that might exist in different fields and in different models. In some embodiments, the user 202 can also provide definitions, configurations and specifications for one or more workflows or kernel meshes (a collection of kernels integrated to perform analytical tasks to generate an answer to a complex query). The registered kernels, user-defined kernels and workflows, and those generated, retrieved or otherwise procured by the search platform 100 can be stored in a mesh vault 208. In some embodiments mesh vault can alternatively be referred to as a modal library or a catalogue of kernels and/or workflows of kernels. Input to the kernels can be raw data, pre-processed data, or output data from another kernel or another mesh. The mesh vault can maintain definitions, configurations and specifications of kernels and workflows and any processing step that may be required when providing an input to a kernel or a workflow.

The search platform 100 can include a runtime component, a mesh runner 210. The mesh runner 210 can interface with the mesh vault 208. When a request for an answer to a complex query, or execution of a workflow is received, the mesh runner 210 can access the mesh vault, and orchestrate the execution of relevant workflows to generate an answer to the complex query. In some embodiments, the mesh runner 210 can be implemented with a state machine, or a combination of state machines, that manages the execution of one or more meshes to provide an answer to a complex query. The mesh runner 210, for example, can manage the computation life cycle of data as it traverses through one or more workflows, and the kernels therein. The mesh runner can act as a controller that provides the data that matches a kernel's data constraints and specification. The mesh runner 210 can also configure a workflow and/or one or more kernels, based on the definitions, configurations and specifications of the workflow and/or the kernels, retrieved from the mesh vault, during runtime.

Figure 3:
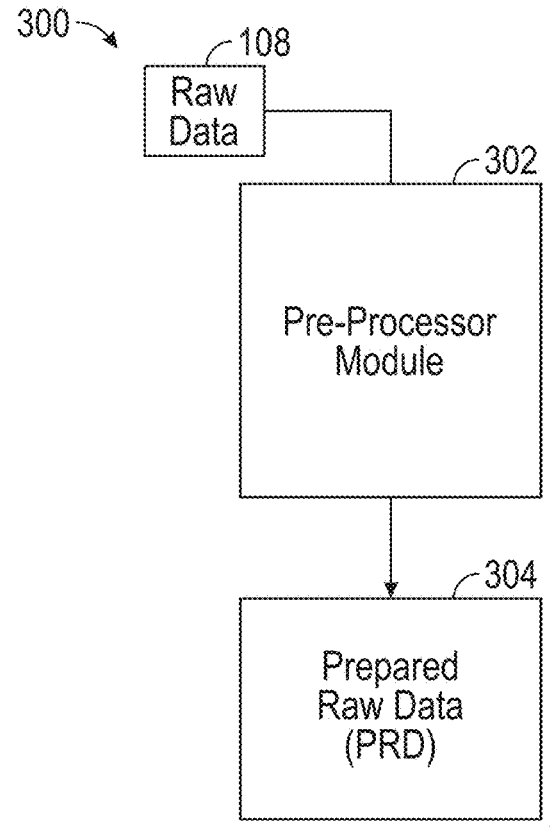
FIG. 3 illustrates a block diagram of a pre-processing module, which can convert, filter, reformat, or otherwise transform raw data into prepared raw data (PRD).

Given the various kernel specifications and kernel data constraints that might exist in the mesh vault 208, the search platform 100 can include a processing (or pre-processing) module, which can convert, filter, reformat or otherwise transform the raw data 108 (or a relevant or applicable portion of it) into data that fits the requirements of one or more kernels in the mesh vault 208. FIG. 3 illustrates a block diagram of a pre-processing module 302, which can convert, filter, reformat, or otherwise transform raw data 108 into prepared raw data (PRD) 304. The PRD 304 fits the specifications and data constraint schema of one or more kernels in the mesh vault 208. In other words, the user 202 does not have to obtain or select the raw data 108 that may be relevant to their models; nor do they have to convert, or format the data that may be relevant to their models. The user 202 provides the model specification and data constraint schema to the search platform 100 and the search platform 100, finds the relevant data, compatible with the user-defined specification and data constraint schema, and/or if necessary convert the relevant data to fit the specification and data constrain schema of the user models.

The data constraints of a kernel can also include its output schema, such as the format and characteristics of the output of a kernel. The search platform 100 can follow the connected graph of a mesh and make the conversions, filtering, formatting and transformations that can make the output of a kernel compatible to its downstream kernels input data constraints. In this manner, as far as transfer of data through a mesh pipeline, the output of a kernel is made compatible with the inputs of its downstream kernels. In some embodiments, the search platform 100 can append a kernel with conversion modules, or alternatively, the input/output (I/O) conversions and transformations within a mesh can be performed at runtime.

Figure 4:
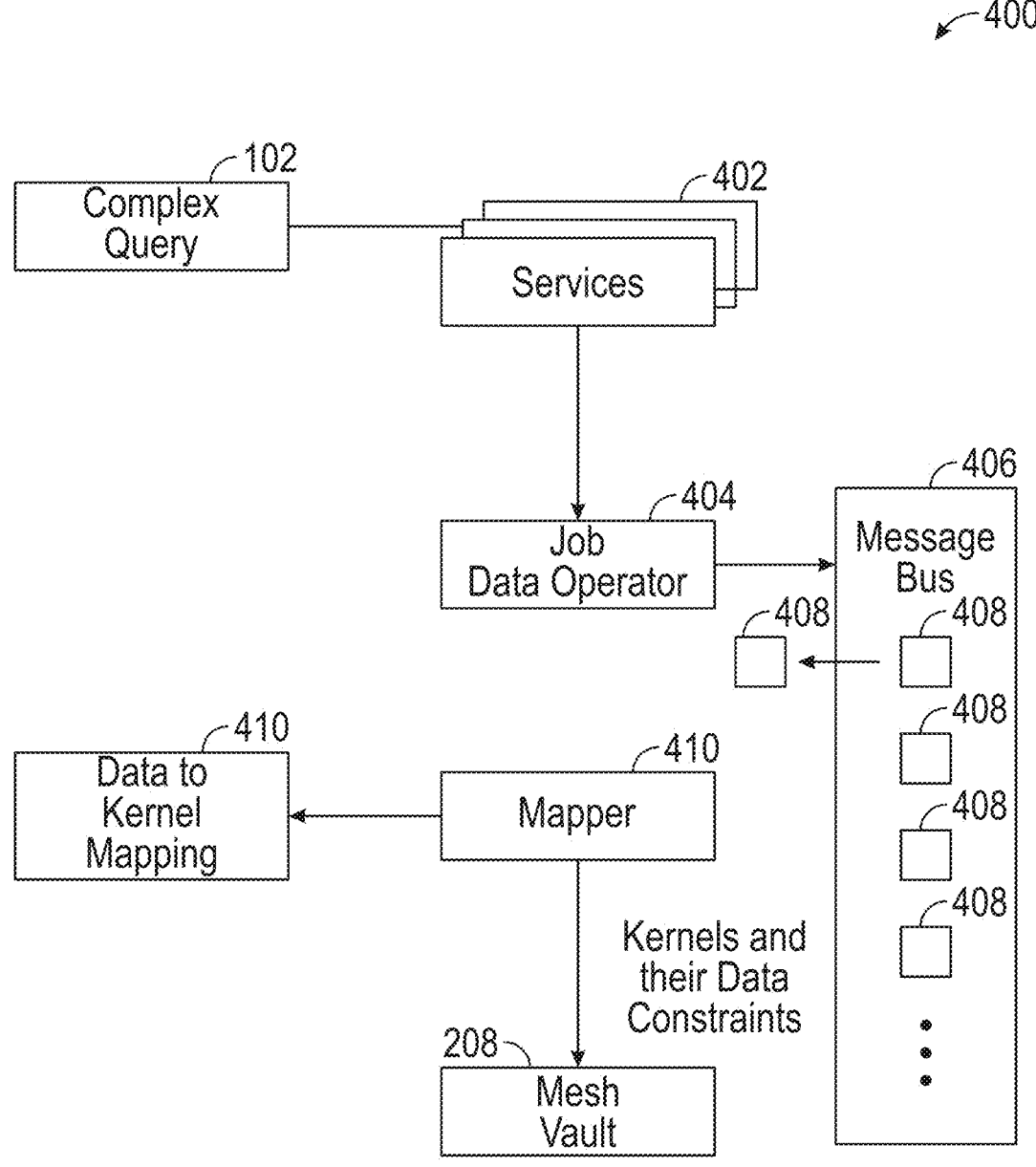
FIG. 4 illustrates a block diagram of example components, which can be used to find answers to a complex query.

FIG. 4 illustrates a block diagram of example components, which can be used to find answers to a complex query 102. A job data operator 404 can fetch PRD from services 402. The services 402 can include the search algorithms 104, or any other services (internal and/or external to the search platform 100) that can provide data relevant to a complex query 102. The services 402 can generate raw data 108 by semantically searching the complex query 102. The services 402, in combination with the preprocessing module 302 (not shown), can generate PRD units of data. A job data operator 404 can place units of data 408 in a message bus 406, individually, in batches, in sets or in other formats, as may be applicable to the type of data. A mapper 410 can pop each unit of data 408 from the message bus 406 and analyze its applicability, relevance, and/or compatibility with a kernel, or a collection of kernels from the mesh vault 208. To determine applicability, relevance and/or compatibility, the mapper 410 can check various data fields, and/or other data characteristics in each unit of data 408, against the data constraints of a kernel or a collection of kernels from the mesh vault 208. For example, ground sample distance (GSD) is a field in some imagery data, which can also be recited in some kernel data constraints. The mapper 410 can check the GSD field of an image to determine whether it is a match with a GSD constraint of a kernel in the mesh vault 208. The mapper 410 can generate a data to kernel (DTK) mapping 412 for each unit of data 408. In other words, the search platform 100 can identify the kernels that can process the unit of data 408, and/or the kernels that are relevant to the unit of data 408.

In some embodiments, the mapper 410 or another component can build a task structure around executing a workflow and outline or manage the runtime or execution behavior of kernels in a mesh and/or any preprocessing, related to kernel I/O.

The search platform 100 can utilize parallelization. For example, the search platform 100 can have in-mesh parallelization and multi-mesh parallelization. In-mesh parallelization includes multiple kernels within a mesh operating on the same set of input data to collaboratively achieve the result (task) of the mesh. Multi-mesh parallelization can include multiple meshes processing the same input data, where each mesh processes the input data to accomplish a different result (task). In case of parallelization, the search platform 100 routes the incoming raw data or PRD to the correct kernel, based on the state of execution of the mesh, upstream kernels and/or the data constraints of the kernels. For example, incoming PRD can include earth observation (EO) data, where one kernel is directed to ship detection, and another kernel can be directed to determining the type of ship (e.g., cargo, passenger, etc.). The two kernels can have different data constraints, but nonetheless both can operate on EO data for their input data objects. In this scenario, the search platform 100 routes the EO data to both kernels.

Figure 5:
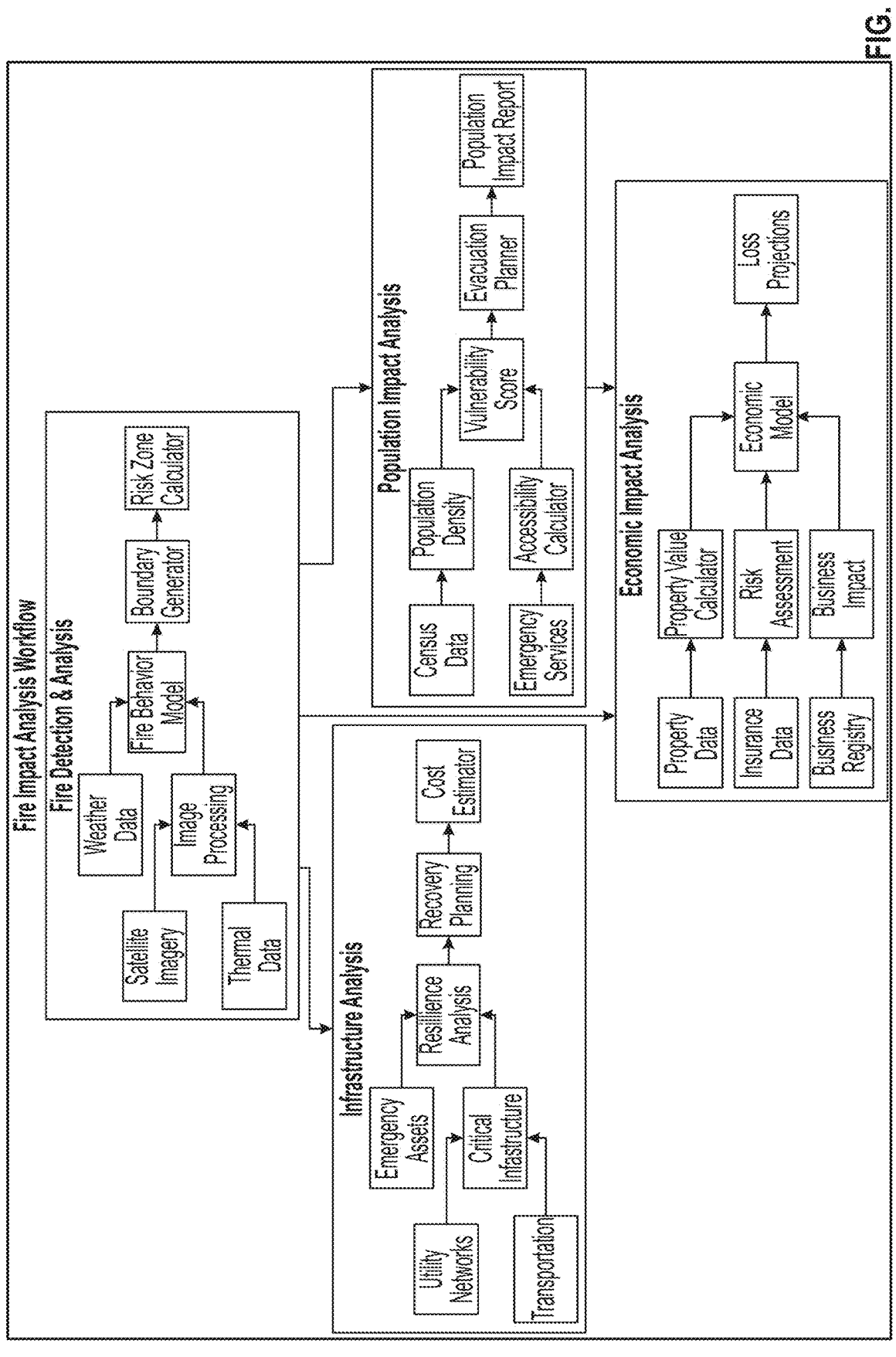
FIG. 5 illustrates an example of a master mesh directed to answering complex queries that can be answered by a fire impact analysis workflow.

FIG. 5 illustrates an example of a master mesh directed to answering complex queries that can be answered by a fire impact analysis workflow. A master mesh can include children meshes and children meshes can have their own children meshes, down to the smallest unit of task definition and processing, a kernel. Raw data, which can be input to the mesh can include satellite imagery data, thermal data, weather data, and other data. Example children meshes in the fire impact analysis include "fire detection and analysis" mesh, "infrastructure analysis" mesh, "population impact analysis" mesh, and "economic impact analysis" mesh. Below the internal kernels of an example fire detection and analysis mesh will be described for illustration purposes; however, the meshes and kernels can take an infinite variety covering various areas of potential search and complex queries by individuals and organizations.

Fire detection and analysis mesh can include kernels, such as image processing kernel, fire behavior kernel, boundary generator kernel, and risk zone calculator. The image processing kernel accepts satellite imagery and thermal data as input. Fire behavior kernel or model can accept an input from the image processing kernel and another input from a weather data service and can generate an estimate of the fire behavior in an area. The boundary generator can draw an outline of an estimated fire in the area, based on the output of the fire behavior model. Kernels can also provide feedback loops to one another to improve the modeling accuracy of a kernel. For example, a weather analysis kernel and the boundary generator kernel can operate in a feedback loop with one another and/or with the fire behavior kernel to improve the fire behavior model.

Model Recommendation Engine

While a user can register a bank of their preferred models with the search platform 100, the platform can also find and recommend relevant models to a user. Stated otherwise, a user complex query 102 can trigger finding and retrieval of raw data 108. The search platform 100 can automatically detect applicable workflows, which can be executed given the relevant raw data 108, retrieved in response to the user complex query 102. In one aspect, a recommendation engine, according to an embodiment, can deploy a two-part approach. In the first part, the semantic context of the complex query 102 can be used to find relevant analytical models to the complex query 102. In the second part, the search algorithms 104 can be used to filter out the analytical models for which there are no corresponding relevant raw data 108. The filtered out model are not executed when the results 114 are produced (because there are no corresponding raw data 108 to those filtered out analytical models); nevertheless, the filtered out models can be recommended to the user, along with type of data can make the filtered out analytical models available to the user. In this manner, the user can determine additional models, which can provide more robots results 114 and may accordingly procure relevant data to make the filtered-out models available for future complex queries of the user in the same field.

In another aspect, the recommendation engine can recommend relevant additional complex queries and additional relevant workflows to the user. For example, a user may present a complex query 102 "what is the economic impact of the Eaton fire in Los Angeles?" The recommendation engine can determine that other fires proximate in time and space to Eaton fire in Los Angeles, and associated workflows and models, not necessarily registered or recited by the user to the search platform can also improve the accuracy and comprehensiveness of the results 114. For example, the recommendation engine can recommend that the user also consider the Palisades fire in Los Angeles to obtain a more comprehensive picture of the economic impact of the Eaton fire. The additional queries recommended can have associated analytical models (shared or independent of the models known or registered by the user, if any). The user can simply approve inclusion of the additional recommended queries, without having to understand or know the complexities of the underlying analytical models. In some embodiments more subject expert users can also access the recommended models, add them to their registered models and/or modify them to better suit their purposes.

Figure 6:
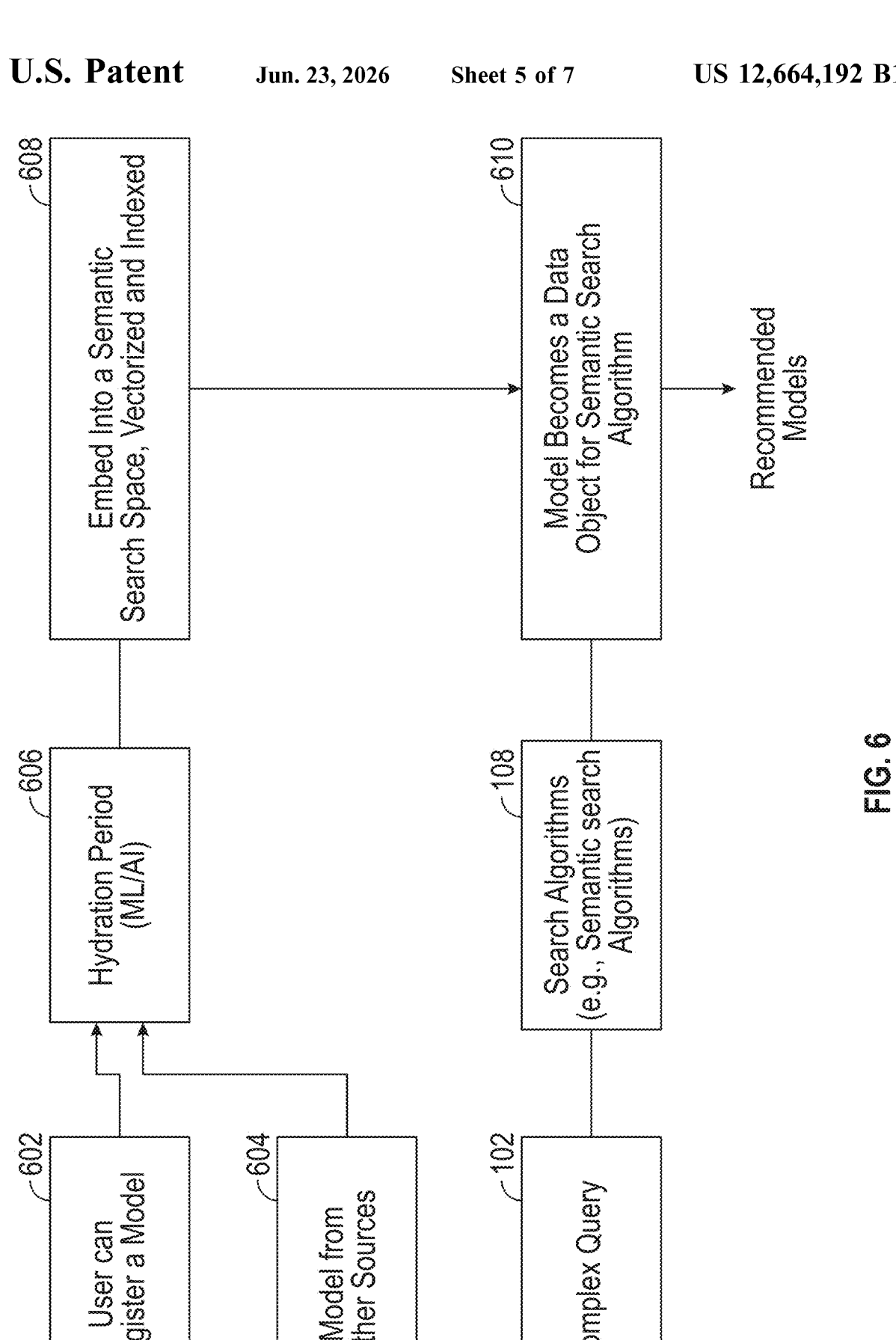
FIG. 6 illustrates a block diagram of example component steps, which can be used in finding and recommending relevant models to a user.

FIG. 6 illustrates a block diagram 600 of example component steps, which can be used in finding and recommending relevant models to a user. Block 602 includes a user optionally registering one or more models, for example, a bank of models. Block 604 includes models accessed or retrieved from other sources, such as models obtained from public sources, such as models provided by standard setting organizations, universities, governmental scientific centers, known industry-specific models, subject matter expert models, and so forth.

At block 606 the models obtained at blocks 602, 604 can go through a hydration period, where AI or machine learning (ML) models, including for example, natural language processing (NLP) pipelines can summarize, identify and tag the models with tags that describe what types and kinds of questions the models can answer, are relevant to, or can improve the results 114, if the models could be deployed with their specified data. At block 608, the model descriptions and tags can be embedded into the semantic search space, generating or contributing to the augmented search space 112. Embedding operations can include vectorizing the model tags and descriptions and indexing them with appropriate pointers to the models code for execution (containerized or API-accessed). At block 610 the models can become an additional data object for the search algorithms 104. In other words, the search algorithms 104 can now semantically search the models, as additional data objects, against the context of the complex query 102 to find and recommend relevant models for the query 102. In one respect, the analytical models (registered by the user or obtained from other sources) can be used to enrich the semantic search space 106, generate an enriched augmented search space 112, which can include not only relevant data, as input data objects, but also analytical models, as data objects, tagged and described ready for ML based semantic search algorithms of the search algorithms 104 to search against a complex query 102.

FIG. 7 illustrates an example flowchart of a method 700 of preparing a robust search space for a complex query. The method starts at step 702. Step 704 includes generating a semantic search space. Step 706 includes obtaining analytical models. Step 708 includes determining relevancy contexts of the obtained models and tagging the obtained models with the relevancy context tags. For example, the obtained models can be processed in a natural language processing (NLP) pipeline and summarized with machine learning algorithms. The summaries can be used to determine relevancy context of the obtained models and tag the models with their respective relevancy context tags. Step 710 includes augmenting the semantic search space with the tagged models, or pointers or indexes to the tagged models. Step 712 includes searching the augmented semantic search space against the context of a complex query. The searching of the augmented semantic search space can include deploying machine learning algorithms to match the context of the complex query against the tags, descriptions or summaries of the models referenced in the augmented search space. Step 714 includes returning the models found in step 712. The models, relevant to the context of the complex query, can be executed, for example, in a workflow to find robust answers to the complex query. For example, step 715 can include a runtime, or an execution step, where a request for execution of a processing of a complex query is received. The prior steps have returned relevant workflows and/or models (kernels), to answer the complex query. The mesh runner 210 can be deployed in step 715 to perform data management, computation and execution management for the life cycle of a workflow, a kernel, or a collection of workflows and kernels. For example, the mesh runner 210 can perform or manage the performance of the procedural processing of the kernels, data flow management, inter- or intra-kernel data converting, formatting and/or transforming, recording of intermediary results, auditing, and similar execution or runtime management. The method ends at step 716.

Example Implementation Mechanism-Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 8:
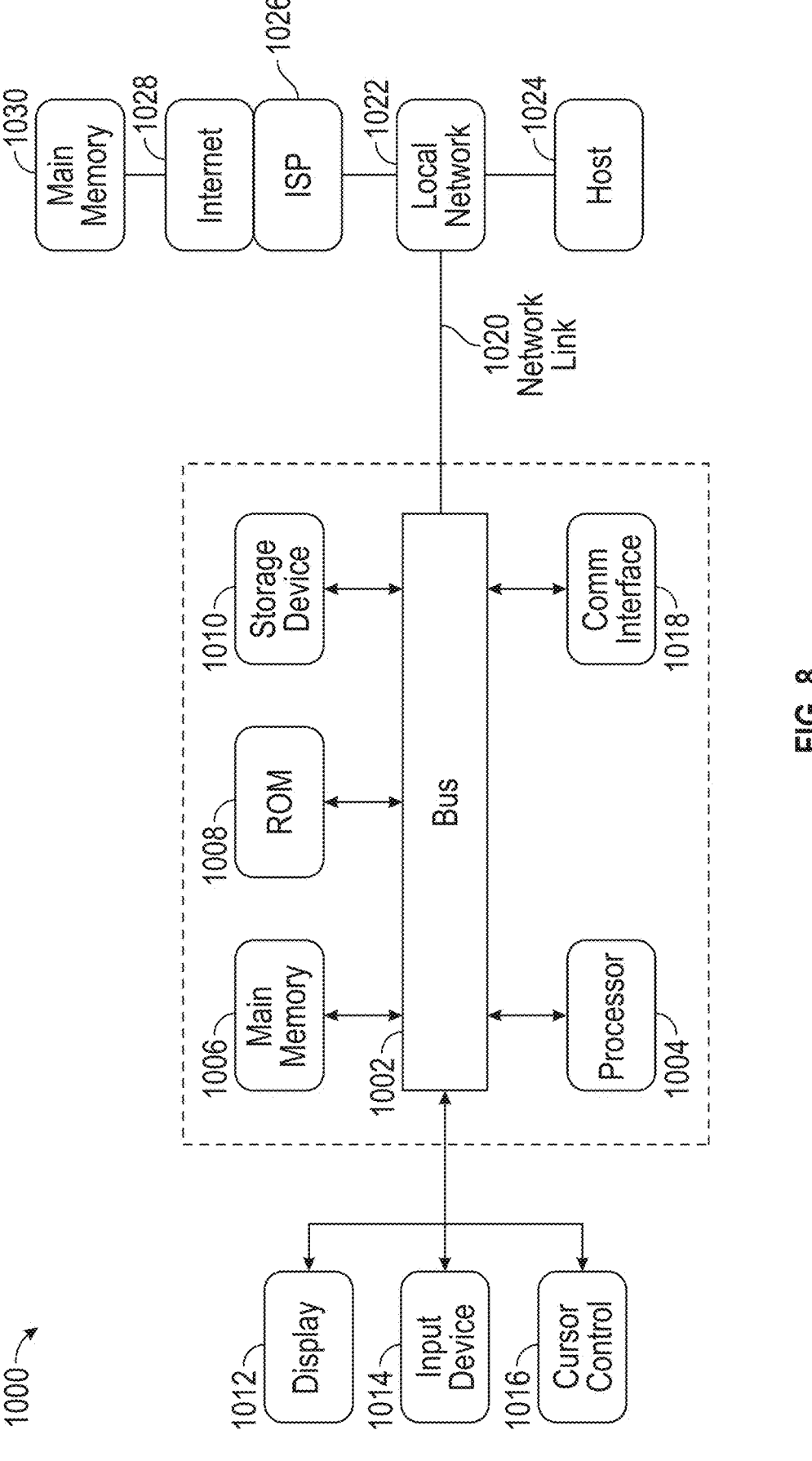
FIG. 8 illustrates an environment in which some embodiments may operate.

For example, FIG. 8 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: receiving a complex query; semantically searching a context of the complex query, generating a semantic search space; searching the semantic search space and retrieving raw data relevant to the complex query; obtaining analytical models, relevant to the context of the complex query; generating an augmented search space, the augmented search space comprising the semantic search space and the analytical models; searching the augmented search space for the analytical models relevant to the context of the complex query; executing one more analytical models, with the raw data or a portion of the raw data as input; and generating results comprising an answer to the complex query.

Example 2: The method of Example 1, further comprising: determining analytical models having corresponding raw data; and executing the determined analytical models to generate the results.

Example 3: The method of any of Examples 1 and 2, further comprising: determining portions of the raw data compatible with an input data constraint of an analytical model; and executing the analytical model with the determined portion of the raw data.

Example 4: The method of any of Examples 1-3, further comprising: determining an input data constraint of an analytical model; and performing one or more preprocessing steps to make the raw data compliant with the input data constraints.

Example 5: The method of any of Examples 1-4, further comprising: obtaining a workflow for generating the results, the workflow comprising kernels, each kernel comprising at least one analytical model; determining input and output data constraints of each kernel; determining portions of the raw data compatible with the input data constraints of one or more kernels in the workflow; transforming output of one more more kernels, at least in part based on the input data constraint of another kernel; executing the workflow, comprising executing the kernels and the models therein; and generating the results.

Example 6: The method of any of Examples 1-5, wherein the analytical models are containerized models, or are accessible via an application programming interface (API).

Example 7: The method of any of Examples 1-6, further comprising: processing the obtained models with a natural language processing (NLP) pipeline, generating summaries of objectives of the obtained models; determining relevancy context of the obtained models, based at least in part on the summaries; tagging the obtained models with one more relevancy context; embedding the obtained models into the augmented search space, using at least in part the relevancy context tags; and searching the augmented search space, at least in part, based on machine learning matching of the context of the complex query with one or more relevancy tags.

Example 8: A non-transitory computer storage medium that stores executable program instructions that, when executed by one or more computing devices, configure the one or more computing devices to perform operations comprising: receiving a complex query; semantically searching a context of the complex query, generating a semantic search space; searching the semantic search space and retrieving raw data relevant to the complex query; obtaining analytical models, relevant to the context of the complex query; generating an augmented search space, the augmented search space comprising the semantic search space and the analytical models; searching the augmented search space for the analytical models relevant to the context of the complex query; executing one more analytical models, with the raw data or a portion of the raw data as input; and generating results comprising an answer to the complex query.

Example 9: The non-transitory computer storage of Example 8, wherein the operations further comprise: determining analytical models having corresponding raw data; and executing the determined analytical models to generate the results.

Example 10: The non-transitory computer storage of any of Examples 8 and 9, wherein the operations further comprise: determining portions of the raw data compatible with an input data constraint of an analytical model; and executing the analytical model with the determined portion of the raw data.

Example 11: The non-transitory computer storage of any of Examples 8-10, wherein the operations further comprise: determining an input data constraint of an analytical model; and performing one or more preprocessing steps to make the raw data compliant with the input data constraints.

Example 12: The non-transitory computer storage of any of Examples 8-11, wherein the operations further comprise: obtaining a workflow for generating the results, the workflow comprising kernels, each kernel comprising at least one analytical model; determining input and output data constraints of each kernel; determining portions of the raw data compatible with the input data constraints of one or more kernels in the workflow; transforming output of one more more kernels, at least in part based on the input data constraint of another kernel; executing the workflow, comprising executing the kernels and the models therein; and generating the results.

Example 13: The non-transitory computer storage of any of Examples 8-12, wherein the analytical models are containerized models, or are accessible via an application programming interface (API).

Example 14: The non-transitory computer storage of any of Examples 8-13, wherein the operations further comprise: processing the obtained models with a natural language processing (NLP) pipeline, generating summaries of objectives of the obtained models; determining relevancy context of the obtained models, based at least in part on the summaries; tagging the obtained models with one more relevancy context; embedding the obtained models into the augmented search space, using at least in part the relevancy context tags; and searching the augmented search space, at least in part, based on machine learning matching of the context of the complex query with one or more relevancy tags.

Example 15: A system comprising one or more processors, wherein the one or more processors are configured to perform operations comprising: receiving a complex query; semantically searching a context of the complex query, generating a semantic search space; searching the semantic search space and retrieving raw data relevant to the complex query; obtaining analytical models, relevant to the context of the complex query; generating an augmented search space, the augmented search space comprising the semantic search space and the analytical models; searching the augmented search space for the analytical models relevant to the context of the complex query; executing one more analytical models, with the raw data or a portion of the raw data as input; and generating results comprising an answer to the complex query.

Example 16: The system of Example 15, wherein the operations further comprise: determining analytical models having corresponding raw data; and executing the determined analytical models to generate the results.

Example 17: The system of any of Examples 15 and 16, wherein the operations further comprise: determining portions of the raw data compatible with an input data constraint of an analytical model; and executing the analytical model with the determined portion of the raw data.

Example 18: The system of any of Examples 15-17, wherein the operations further comprise: determining an input data constraint of an analytical model; and performing one or more preprocessing steps to make the raw data compliant with the input data constraints.

Example 19: The system of of any of Examples 15-19, wherein the operations further comprise: obtaining a workflow for generating the results, the workflow comprising kernels, each kernel comprising at least one analytical model; determining input and output data constraints of each kernel; determining portions of the raw data compatible with the input data constraints of one or more kernels in the workflow; transforming output of one more more kernels, at least in part based on the input data constraint of another kernel; executing the workflow, comprising executing the kernels and the models therein; and generating the results.

Example 20: The system of any of Examples 15-19, wherein the operations further comprise: processing the obtained models with a natural language processing (NLP) pipeline, generating summaries of objectives of the obtained models; determining relevancy context of the obtained models, based at least in part on the summaries; tagging the obtained models with one more relevancy context; embedding the obtained models into the augmented search space, using at least in part the relevancy context tags; and searching the augmented search space, at least in part, based on machine learning matching of the context of the complex query with one or more relevancy tags.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed:

1. A computer-implemented method, performed by one or more processors of a search platform, comprising:

registering, via an interface of the search platform, multiple kernels and a workflow that performs a processing pipeline by executing the registered multiple kernels, wherein one or more kernels include data constraints;

receiving a complex query via the search platform;

semantically searching a context of the complex query, and generating a semantic search space;

searching the semantic search space and retrieving raw data relevant to the complex query;

obtaining the one or more kernels relevant to the context of the complex query;

processing the obtained the one or more kernels with a natural language processing (NLP) pipeline, generating summaries of objectives of the obtained kernels;

determining relevancy context of the obtained the one or more kernels, based at least in part on the summaries;

tagging the obtained the one or more kernels with one more relevancy context;

generating an augmented search space, the augmented search space comprising the semantic search space and the workflow;

embedding the obtained the one or more kernels into the augmented search space, using at least in part the relevancy context tags; and searching the augmented search space, at least in part, based on machine learning matching of the context of the complex query with one or more relevancy tags;

controlling by a mesh runner the performance of the workflow by executing the obtained the one or more kernels using the raw data or a portion of the raw data as input into one or more of the executed the obtained the one or more kernels; and generating results comprising an answer to the complex query based on the performance of the workflow.

2. The computer-implemented method of claim 1, further comprising:

prior to executing the workflow, transforming, by a processing module, the raw data into a data format compatible with the data constraints.

3. The computer-implemented method of claim 1, wherein the workflow is determined to be performed is based on the raw data, and wherein the executed mesh runner matches data constraints of the obtained the one or more kernel to the raw data.

4. The computer-implemented method of claim 1, further comprising:

obtaining the workflow for generating the results, the workflow comprising the obtained the one or more kernels, each kernel comprising at least one analytical model;

determining input and output data constraints of each of the obtained the one or more kernels;

determining portions of the raw data compatible with the input data constraints of the obtained the one or more kernels in the workflow;

transforming output of the obtained the one or more kernels, at least in part based on the input data constraint of another kernel;

executing the workflow, comprising executing the obtained the one or more kernels and the models therein; and generating the results.

5. The computer-implemented method of claim 1, wherein the obtained the one or more kernels are connected, via the interface, to form a directed computational graph of the multiple kernels.

6. A non-transitory computer storage medium that stores executable program instructions that, when executed by one or more computing devices, configure the one or more computing devices to perform operations comprising:

registering, via an interface of a search platform, multiple kernels and a workflow that performs a processing pipeline by executing the registered multiple kernels, wherein one or more kernels include data constraints;

receiving a complex query via the search platform;

semantically searching a context of the complex query, and generating a semantic search space;

searching the semantic search space and retrieving raw data relevant to the complex query;

obtaining the one or more kernels relevant to the context of the complex query;

processing the obtained the one or more kernels with a natural language processing (NLP) pipeline, generating summaries of objectives of the obtained kernels;

determining relevancy context of the obtained the one or more kernels, based at least in part on the summaries;

tagging the obtained the one or more kernels with one more relevancy context;

generating an augmented search space, the augmented search space comprising the semantic search space and the workflow;

embedding the obtained the one or more kernels into the augmented search space, using at least in part the relevancy context tags; and searching the augmented search space, at least in part, based on machine learning matching of the context of the complex query with one or more relevancy tags;

controlling by a mesh runner the performance of the workflow by executing the obtained the one or more kernels using the raw data or a portion of the raw data as input into one or more of the executed the obtained the one or more kernels; and generating results comprising an answer to the complex query based on the performance of the workflow.

7. The non-transitory computer storage of claim 6, wherein the operations further comprise:

prior to executing the workflow, transforming, by a processing module, the raw data into a data format compatible with the data constraints.

8. The non-transitory computer storage of claim 6, wherein the operations further comprise: wherein the workflow is determined to be performed is based on the raw data, and wherein the executed mesh runner matches data constraints of the obtained the one or more kernel to the raw data.

9. The non-transitory computer storage of claim 6, wherein the operations further comprise:

obtaining the workflow for generating the results, the workflow comprising the obtained the one or more kernels, each kernel comprising at least one analytical model;

determining input and output data constraints of each of the obtained the one or more kernels;

determining portions of the raw data compatible with the input data constraints of the obtained the one or more kernels in the workflow;

transforming output of the obtained the one or more kernels, at least in part based on the input data constraint of another kernel;

executing the workflow, comprising executing the obtained the one or more kernels and the models therein; and generating the results.

10. The non-transitory computer storage of claim 6, wherein the multiple kernels are connected, via the interface, to form a directed computational graph of the obtained the one or more kernels.

11. A system comprising a search platform having one or more processors, wherein the one or more processors are configured to perform operations comprising:

registering, via an interface of the search platform, multiple kernels and a workflow that performs a processing pipeline by executing the registered multiple kernels, wherein one or more kernels include data constraints;

receiving a complex query via the search platform;

semantically searching a context of the complex query, and generating a semantic search space;

searching the semantic search space and retrieving raw data relevant to the complex query;

obtaining the one or more kernels relevant to the context of the complex query;

processing the obtained the one or more kernels with a natural language processing (NLP) pipeline, generating summaries of objectives of the obtained kernels;

determining relevancy context of the obtained the one or more kernels, based at least in part on the summaries;

tagging the obtained the one or more kernels with one more relevancy context;

generating an augmented search space, the augmented search space comprising the semantic search space and the workflow;

embedding the obtained the one or more kernels into the augmented search space, using at least in part the relevancy context tags; and searching the augmented search space, at least in part, based on machine learning matching of the context of the complex query with one or more relevancy tags;

controlling by a mesh runner the performance of the workflow by executing the obtained the one or more kernels using the raw data or a portion of the raw data as input into one or more of the executed the obtained the one or more kernels; and generating results comprising an answer to the complex query based on the performance of the workflow.

12. The system of claim 11, wherein the operations performed by the one or more processors further comprise:

prior to executing the workflow, transforming, by a processing module, the raw data into a data format compatible with the data constraints.

13. The system of claim 11, wherein the workflow is determined to be performed is based on the raw data, and wherein the executed mesh runner matches data constraints of the obtained the one or more kernel to the raw data.

14. The system of claim 11, wherein the operations performed by the one or more processors further comprise:

obtaining the workflow for generating the results, the workflow comprising the obtained the one or more kernels, each kernel comprising at least one analytical model;

determining input and output data constraints of each of the obtained the one or more kernels;

determining portions of the raw data compatible with the input data constraints of the obtained the one or more kernels in the workflow;

transforming output of the obtained the one or more kernels, at least in part based on the input data constraint of another kernel;

executing the workflow, comprising executing the obtained the one or more kernels and the models therein; and generating the results.

* * * * *